United States Patent
Hotchkiss et al.

[11] 3,892,330
[45] July 1, 1975

[54] VEHICLE ANTI-SIPHONING DEVICE

[76] Inventors: Manford D. Hotchkiss, 879 J St.;
Ronald G. Proctor, 999 9th St., both of Washougal, Wash. 98671

[22] Filed: Apr. 24, 1974

[21] Appl. No.: 463,521

[52] U.S. Cl. .............. 220/86 AT; 29/423; 29/451
[51] Int. Cl. ................................................ B67c 3/00
[58] Field of Search ........ 220/86 AT, 86 R; 138/89; 85/67, 79, 80, 81, 83, 3 S; 267/114; 29/423, 451

[56] References Cited
UNITED STATES PATENTS

| | | | |
|---|---|---|---|
| 1,584,851 | 5/1926 | Crone | 85/3 S |
| 1,604,977 | 11/1926 | Crone | 85/3 S |
| 1,911,987 | 5/1933 | Casey | 220/86 AT |
| 2,002,818 | 5/1935 | Jones | 220/86 AT |
| 2,373,470 | 4/1945 | Hanke | 220/86 AT |
| 2,496,992 | 2/1950 | Glidden | 220/86 AT |
| 3,263,629 | 8/1966 | Higuchi | 248/361 |

Primary Examiner—William I. Price
Assistant Examiner—Allan N. Shoap

[57] ABSTRACT

A spiral spring for crosswise disposition within the fillerpipe of an automotive fuel tank. End members confine the spring for insertion into and along the filler pipe. Retention means including a gasoline soluble component subsequently disconnects the end members whereupon the spring secures the end members in engagement with the filler pipe wall to prevent dislodgment or removal. Tethering means limit inward travel of the device along the filler pipe during installation.

7 Claims, 6 Drawing Figures

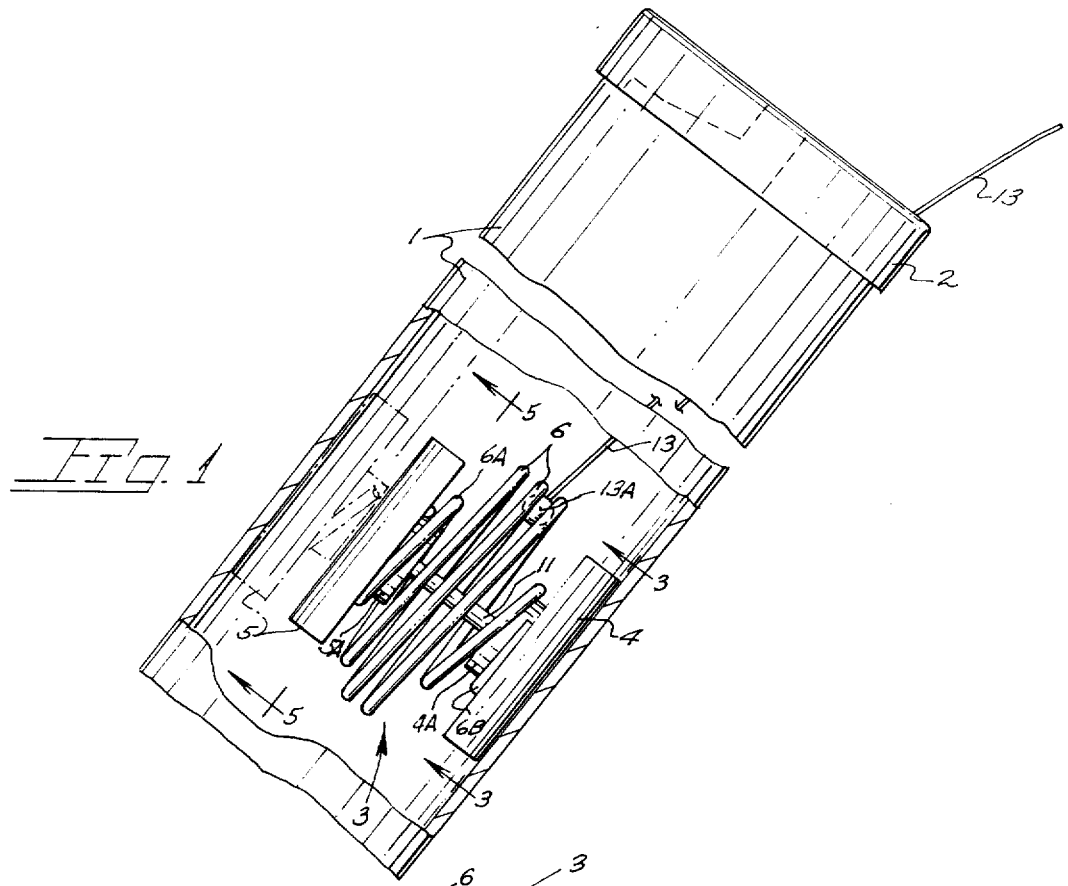

VEHICLE ANTI-SIPHONING DEVICE

BACKGROUND OF THE INVENTION

The present invention is directed toward a device for placement within the filler pipe of a vehicle gas tank to prevent the insertion of a siphon hose while not interfering with the normal passage of gasoline through the filler pipe.

Well known in the prior art are locking gas caps intended to prevent the theft of gasoline from vehicle gas tanks. Such caps are costly and further result in the inconvenience of having to open and close with a key. The risk is always present that the gas cap key will be forgotten or lost by the car owner or accidentally kept by the attendant. Further, such caps are of a size greater than the standard gas cap and occasionally prevent normal closure of the filler pipe access door.

SUMMARY OF THE INVENTION

The instant device is for inserted placement along the length of the filler pipe to block the passage of a small diameter hose through which gas could otherwise be siphoned while permitting normal gasoline flow through the filler pipe during fueling.

The device is installed at a distance remote from the filler pipe end so as to not interfere with the insertion of the gas pump nozzle and accordingly the device is not susceptible to unauthorized removal. Spiral coils of a transversely disposed spring serve to obstruct the passage of the end of an inserted hose. A pair of end members are biased outwardly by the spring into firm engagement with the interior wall of the filler pipe to secure the device in place. Retention means serves to hold the end members and spring in collapsed configuration permitting insertion of the device into and along the filler pipe whereupon said retention means is disconnected from the end members permitting spring expansion. For placement of the device into the filler pipe, at a desired location therealong, tethering means are provided with means are detached upon release of the end members by the retention means which includes a soluble member.

Important objectives of the present anti-siphoning device include: the provision of a device positionable within a filler pipe and having a transversely disposed spring member wherein the coils are offset from one another with respect to the filler pipe axis to prevent passage of a siphon hose end; the provision of a device positionable remotely from the inlet end of the pipe so as to avoid removal by unauthorized persons; the provision of a device for placement within a filler pipe at a depth so as to not interfere with insertion of the spout of a gas pump nozzle; the provision of a device having retention means holding the device in a contacted state permitting convenient insertion within the filler pipe with said means being subsequently actuated permitting spring expansion, and; the provision of a device wherein one size of device is adapted for use with all automotive filler pipes.

In the accompanying drawing:

FIG. 1 is a side elevational view of the device disposed within a gas tank filler pipe prior to release of retention means, FIG. 2 is a plan view of the device in expanded engagement with the wall of a filler pipe, FIG. 3 is an elevational view of one end member of the device detached from the spring component, FIG. 4 is a vertical section taken along line 4—4 of FIG. 3 showing end member details and retention means, FIG. 4A is a view similar to FIG. 4 showing a modified end member, and FIG. 5 is an elevational view of an end member taken along line 5—5 of FIG. 1.

DETAILED DESCRIPTION OF THE PREFERRED EMBODIMENT

With continuing attention to the accompanying drawing wherein applied reference numerals indicate parts similarly identified in the following description, the reference numeral 1 indicates a gas tank filler pipe normally inclined and terminating upwardly in a rim structure 2 having an internally recessed rim for the attachment of a cap all being of a conventional nature.

Indicated generally at 3 is the present anti-siphoning device disposed at a point along the filler pipe remote from rim 2. The device comprises end members at 4 and 5 retained in spaced relationship so as to confine a spiral spring 6 therebetween. The spring is barrel shaped having reduced ends at 6A and 6B. The spring ends are in circumposed attachment to annular projections 4A and 5A integral with their respective end members. To assure secure attachment of the spring ends with the projections, each of said projections have annular walls somewhat inclined to the axis of the projection (as seen in FIG. 4) so as to confine the spring end against a base at 7 and 8 of each end member. The spring ends 6A, 6B are rolled to a radius somewhat less than that of the projections to permit the end members to be snapped into engagement with the spring ends.

Retention means are disclosed in the form of a pin 11 serving to hold the end members and spring 6 in the compact configuration shown in FIG. 1. With attention to FIG. 4, one end of pin 11 terminates in a head 11A located within a shouldered opening 9 formed in the end member. Said opening is occupied by a soluble body 10 which body may be formed of synthetic resinous material such as that manufactured and sold under the registered trademark STYROFOAM or other suitable material soluble in gasoline or other mixture of hydrocarbons. The shouldered opening is defined by an inclined wall surface 9A which serves to retain body 10 which in turn retains pin head 11A against axial extraction until such time as body 10 is at least partially dissolved permitting head 11A to pass through opening 9. The opposite (unseen) end of pin 11 is secured to the remaining end member in any suitable manner.

As best viewed in FIGS. 1 and 2, a tether 13 is applied to the device which attachment may be with the spring 6 to permit lowering of the device to a desired depth within the filler pipe. The device is so held during the initial discharge of gasoline from a pump nozzle causing, as above noted, the release of pin head 11A permitting expansion of the device to the FIG. 2 configuration. The expansion of the coils of spring 6 releases the enlarged ball 13A at the end of tether 13 which is withdrawn from the filler pipe to complete the installation of the device.

As seen in FIGS. 4 and 5, the end members 4 and 5 are beveled at both their upper and lower edges at 4B and 5B to provide an angular edge to firmly engage the lip or rim commonly found at the ends of a filler pipe which engagement prevents removal of the device in either direction. Similarly, in a modified form of end member as viewed in FIG. 4A, zinc chromate screws at 14 are carried by each of said end members the screws having conical ends to assure permanent seating engagement with the filler pipe wall upon expansion of spring 6.

A further modification is shown in FIG. 4A wherein a spring end 6B is typically secured to projection 4A by a pin 15 embedded within said projection. Accordingly, the projections may be of straight, wall configuration.

With reference to FIG. 2 it will be seen that entry of a siphon hose is barred by the spring coils as the conduit end will be stopped by either the upper or lower arcs of a coil. While some spacing is apparent between the coils, the spacing is such as to block passage of all but a very small diameter hose which would make siphoning highly impractical to a thief.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. An anti-siphoning device for installation within a gas tank filler pipe to block the passage of a pipe inserted siphon hose without obstructing normal gasoline passage, said device comprising,
   a spiral spring in lengthwise compression with the axis of said spring disposed transversely within the filler pipe,
   end members oppositely mounted to the ends of said spring confining same in compression to permit insertion and passage of the device along the filler pipe,
   retention means extending intermediate said end members holding same against the biasing action of the spring, said retention means including a component soluble upon contact with gasoline for disconnecting said end members permitting spring expansion and forceful seating of the end members into engagement with the filler pipe, and
   the expanded spring having spaced apart coil segments extending transversely across the interior area of the pipe to prevent hose passage.

2. The anti-siphoning device as claimed in claim 1 additionally including tethering means extending outwardly along the filler pipe to limit inward passage of the device during installation prior to disconnection of the end members.

3. The anti-siphoning device as claimed in claim 2 wherein each of said end members include an annular projection having a wall for circumposed attachment of a circular spring end.

4. The anti-siphoning device as claimed in claim 3 wherein said wall is inclined relative to the axis of said projection to assure retention of the circular spring end.

5. The anti-siphoning device as claimed in claim 1 wherein said end members terminate in upper and lower beveled edges to engage filler pipe rims thereby preventing removal of the device from said pipe.

6. The anti-siphoning device as claimed in claim 1 wherein said end members additionally include screw means engageable with the filler pipe wall to prevent dislodgement of the device from its operative position.

7. The anti-siphoning device as claimed in claim 1 wherein said end members include laterally projecting pins, said pins serving to retain the spring ends in attachment with the end members.

* * * * *